Oct. 30, 1934.  H. J. NEUMILLER  1,978,594
MACHINE FOR MAKING AND SEALING CONTAINERS
FROM TRANSPARENT CELLULOSE MATERIAL
Filed Feb. 8, 1932    12 Sheets-Sheet 1
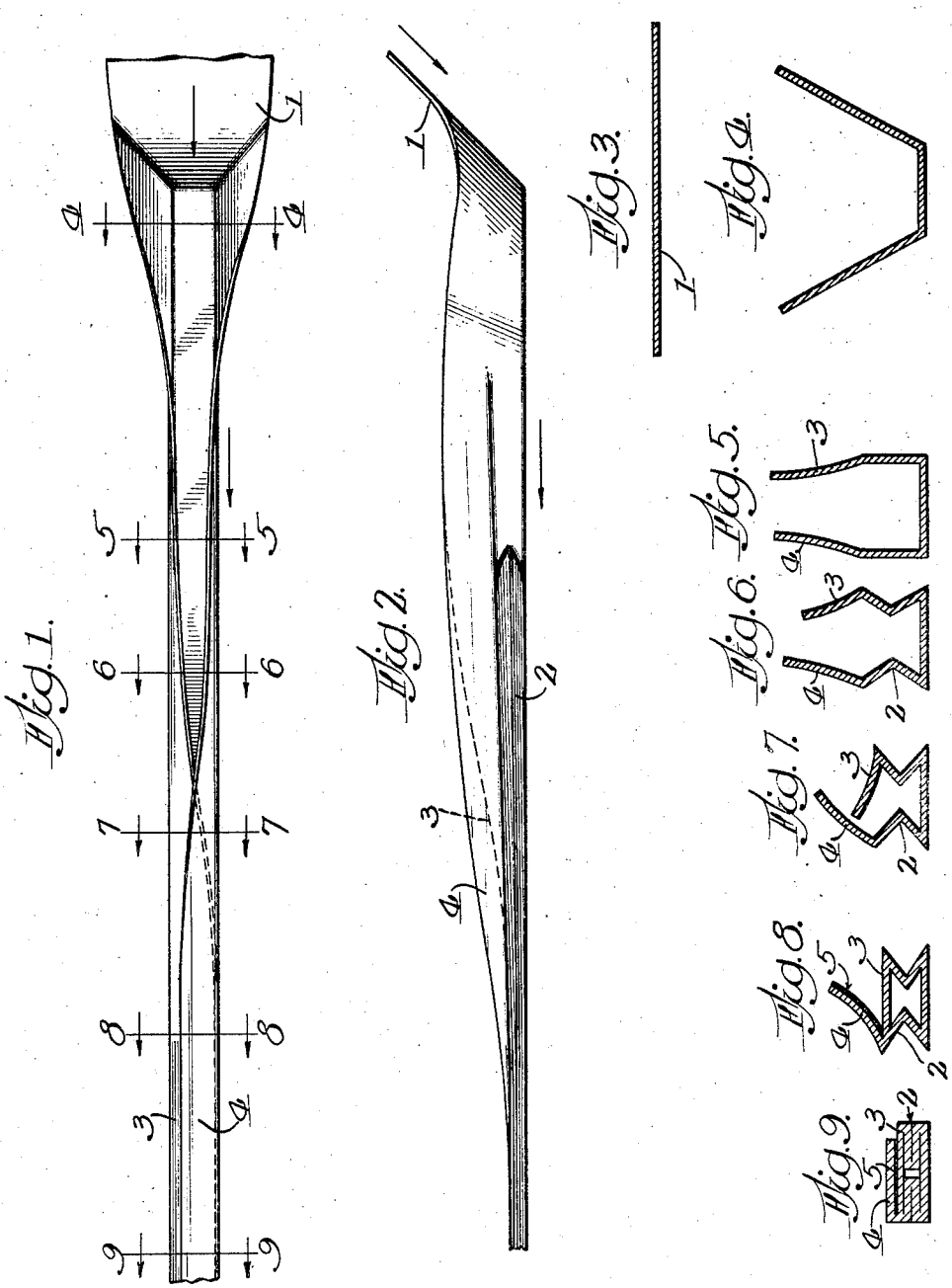

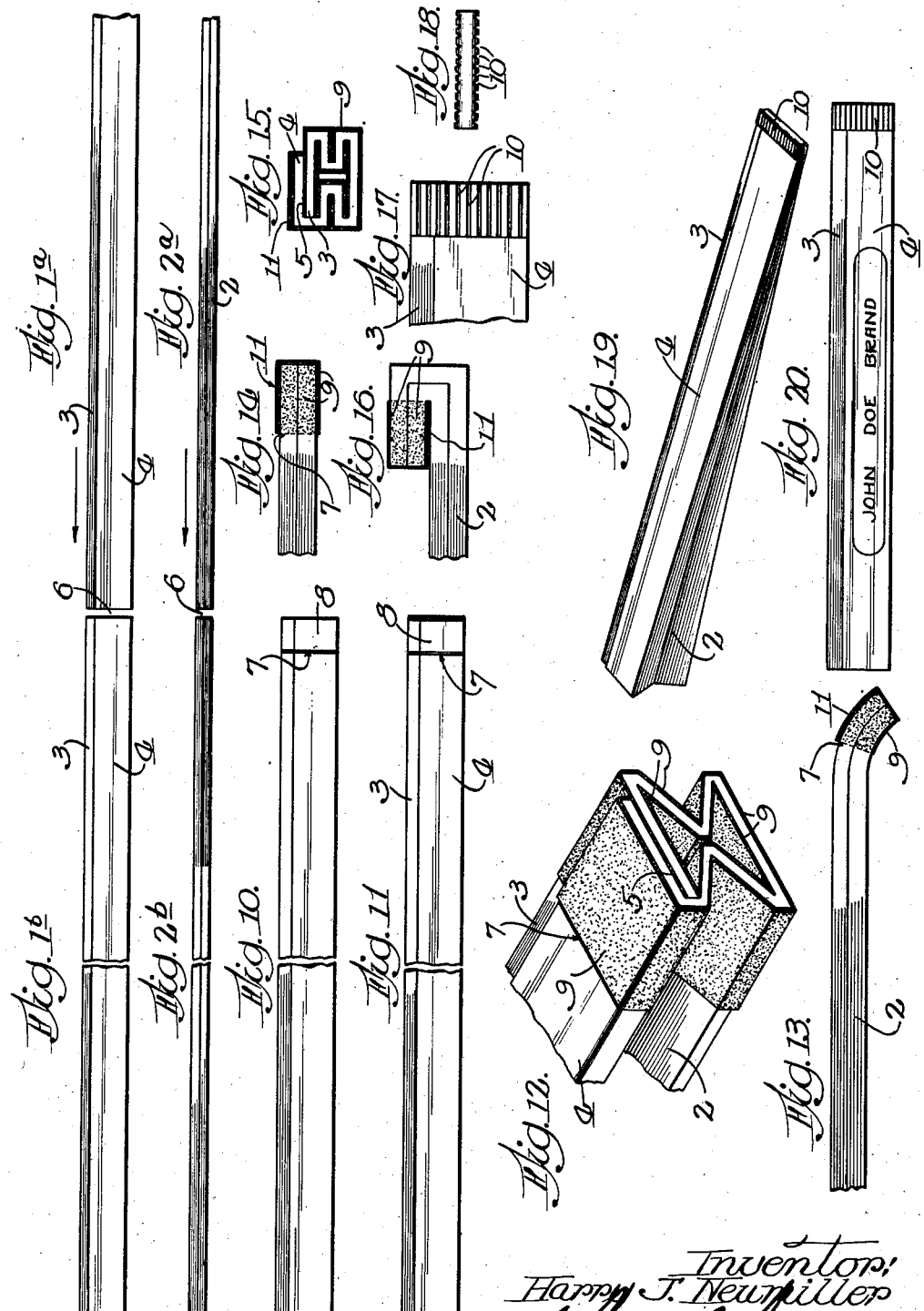

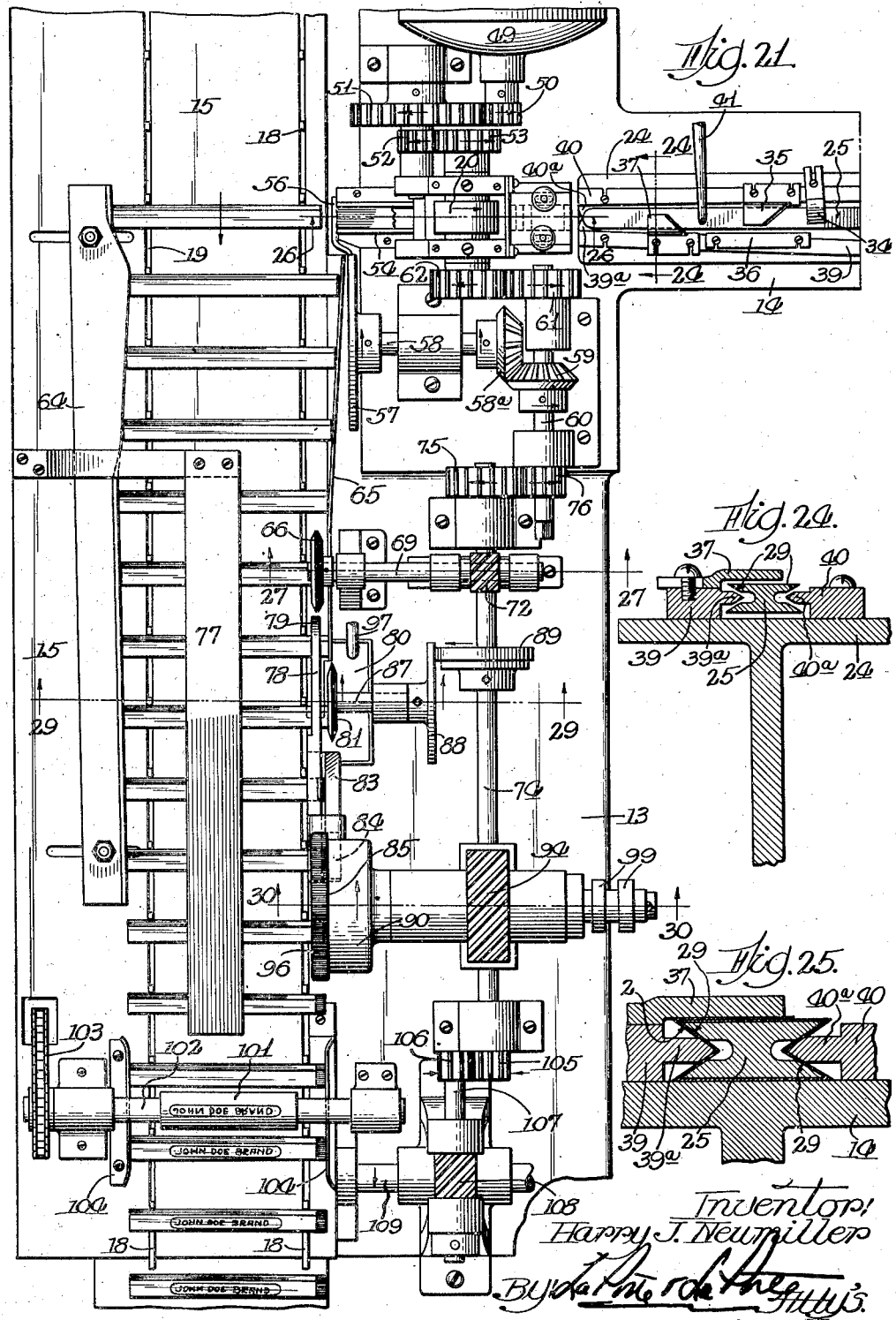

Oct. 30, 1934.  H. J. NEUMILLER  1,978,594
MACHINE FOR MAKING AND SEALING CONTAINERS
FROM TRANSPARENT CELLULOSE MATERIAL
Filed Feb. 8, 1932    12 Sheets-Sheet 4
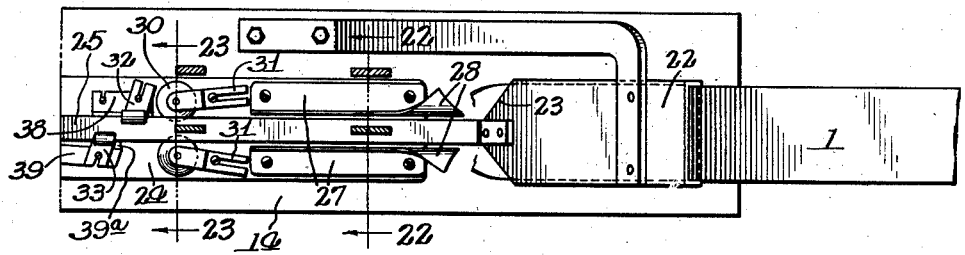
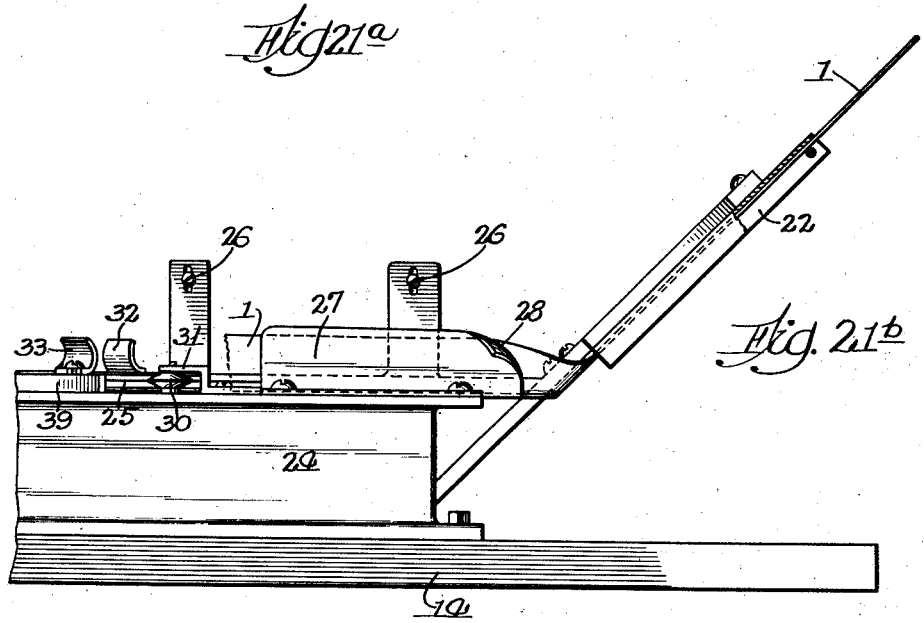
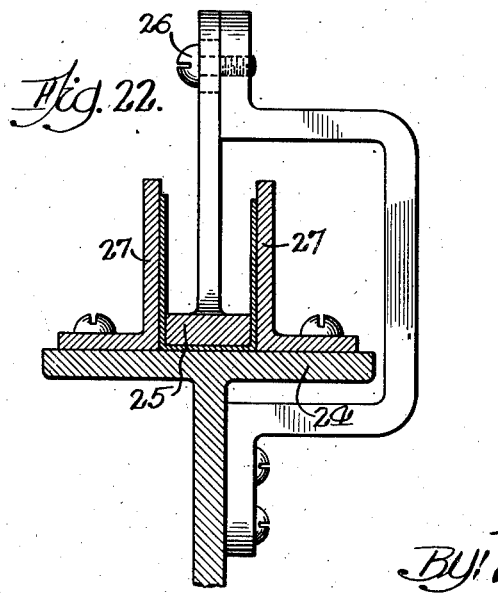
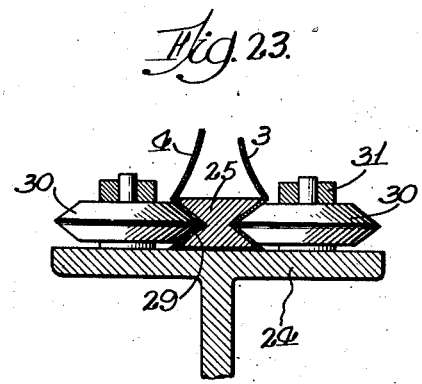
Inventor:
Harry J. Neumiller
By: LaPorte ... Attys.

Oct. 30, 1934.    H. J. NEUMILLER    1,978,594
MACHINE FOR MAKING AND SEALING CONTAINERS
FROM TRANSPARENT CELLULOSE MATERIAL
Filed Feb. 8, 1932    12 Sheets-Sheet 5
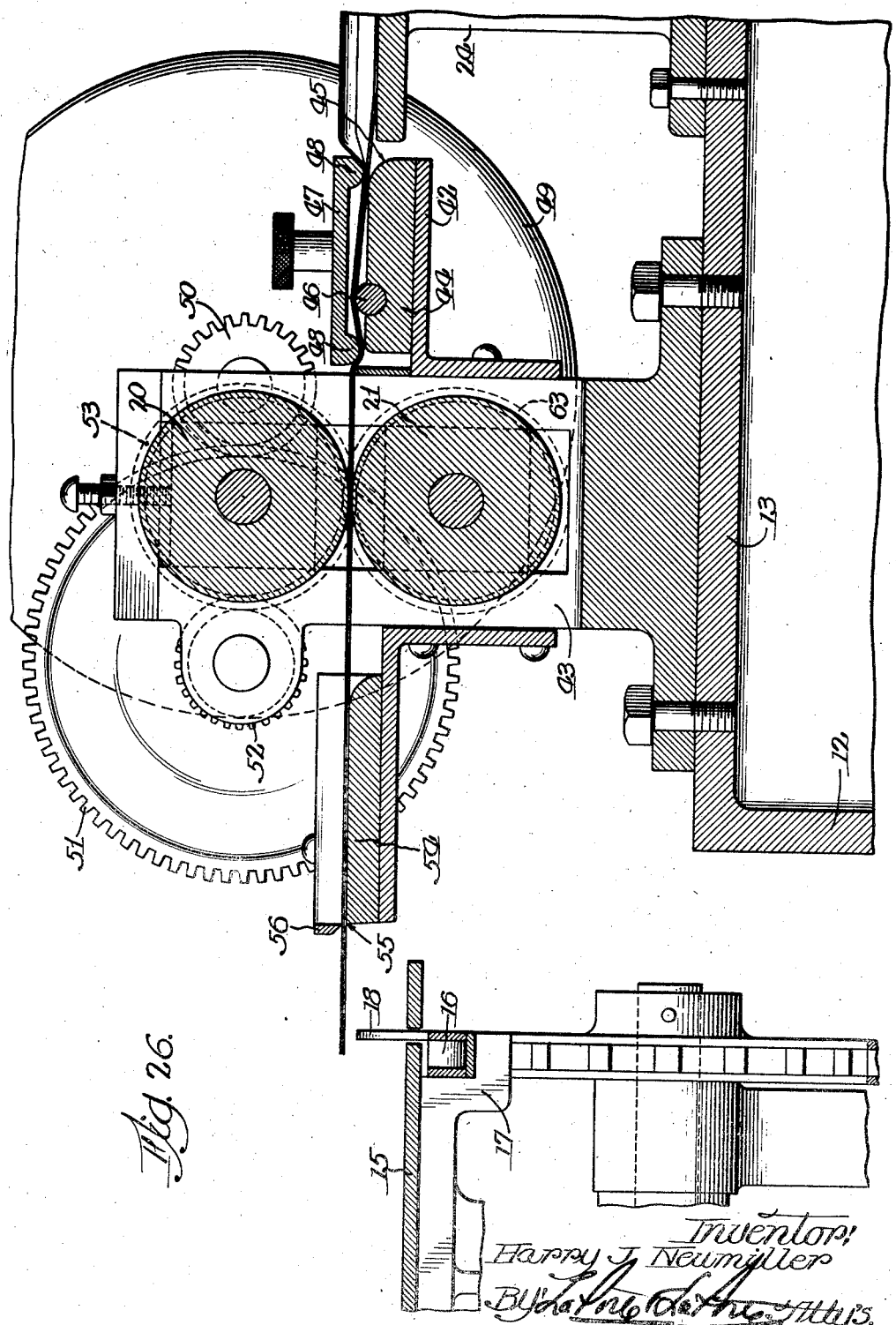

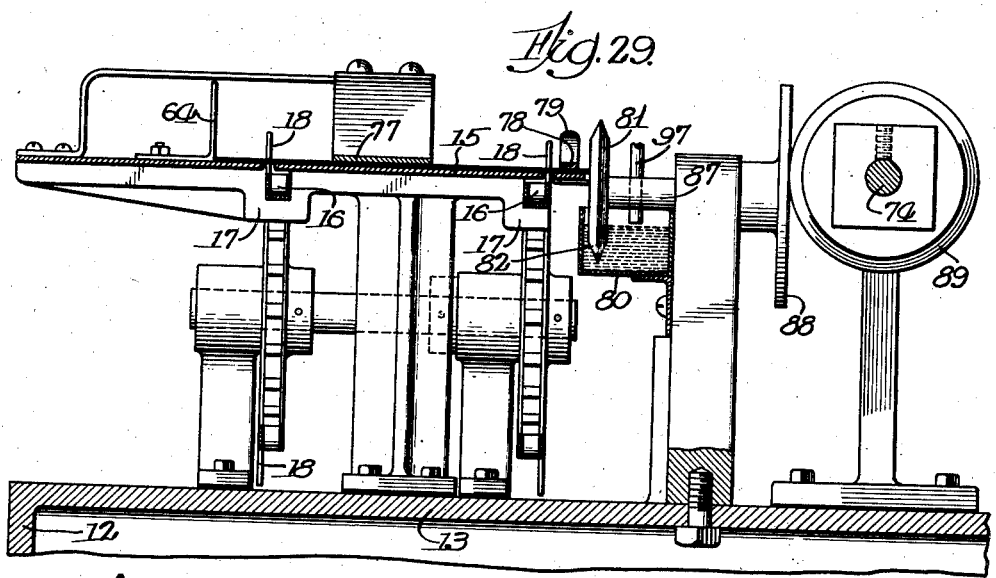

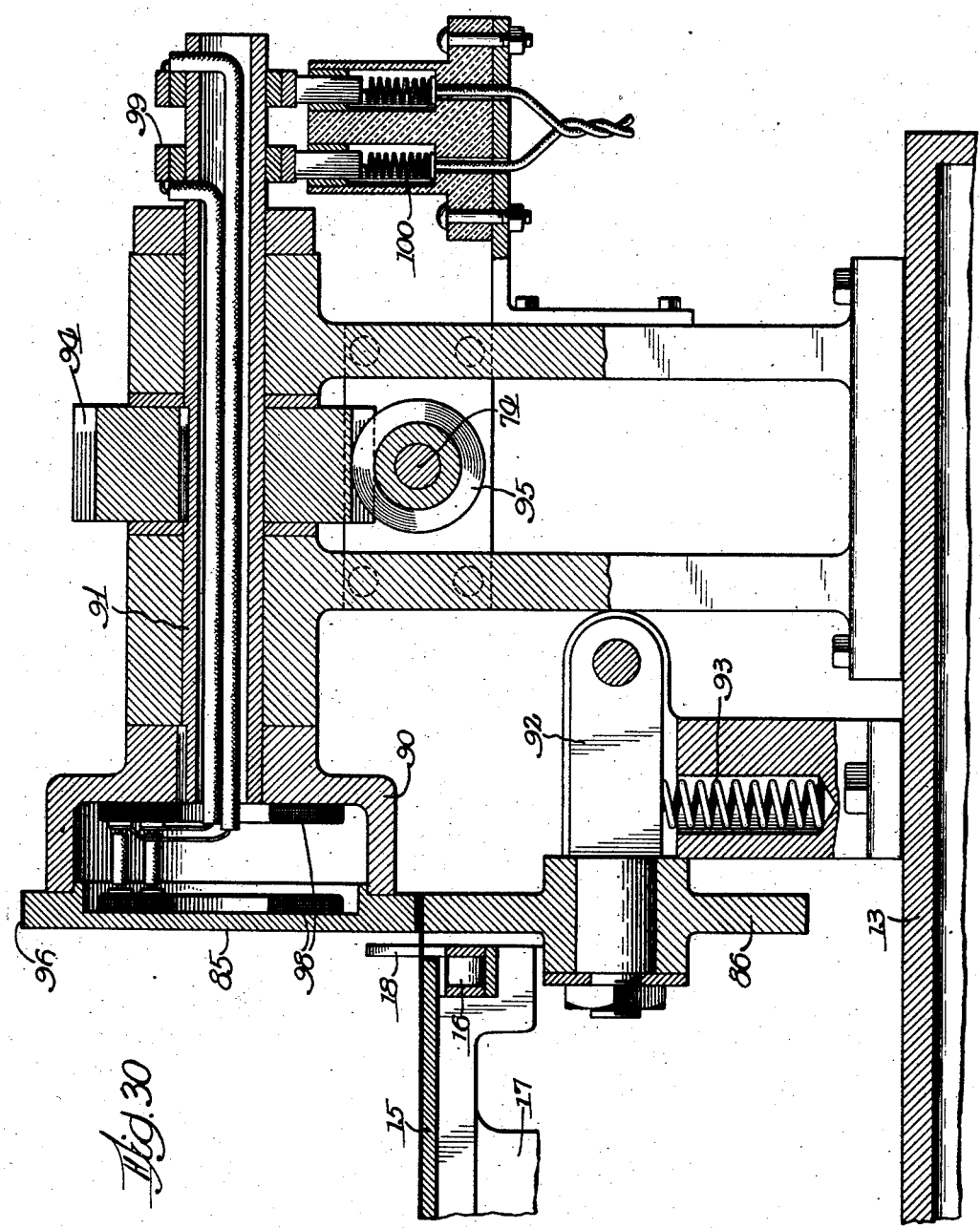

Oct. 30, 1934.   H. J. NEUMILLER   1,978,594
MACHINE FOR MAKING AND SEALING CONTAINERS
FROM TRANSPARENT CELLULOSE MATERIAL
Filed Feb. 8, 1932   12 Sheets-Sheet 8
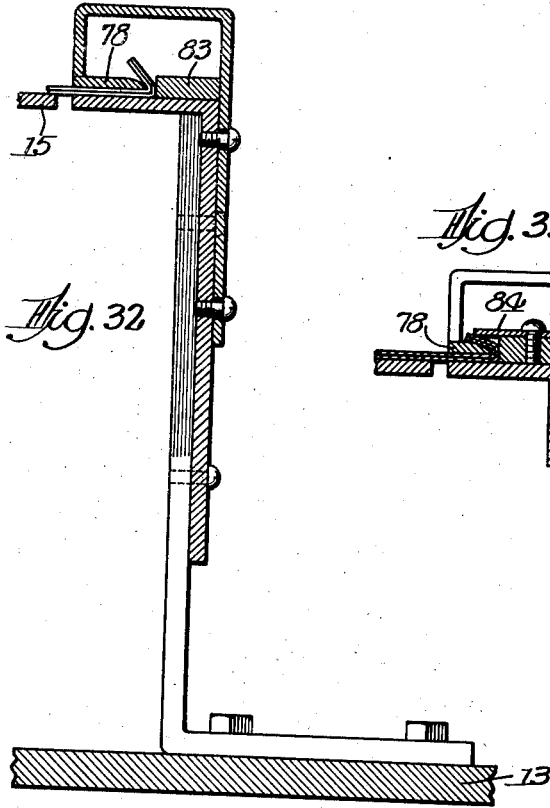
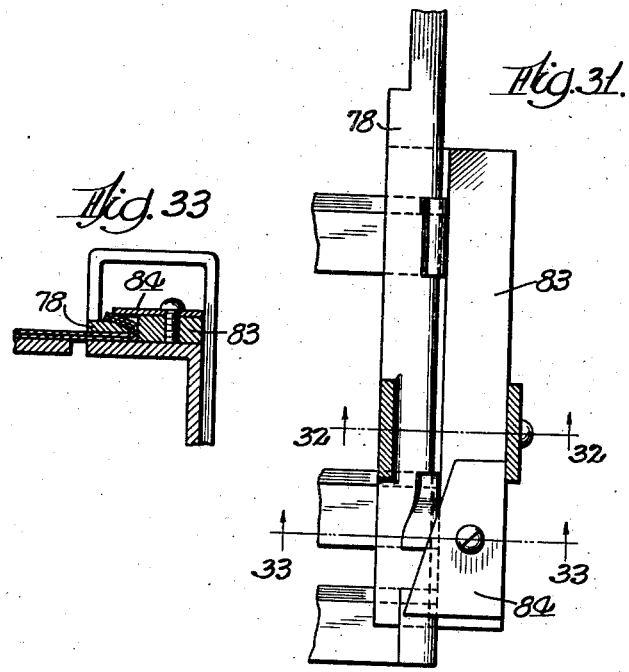
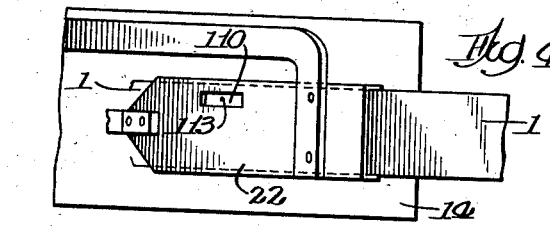
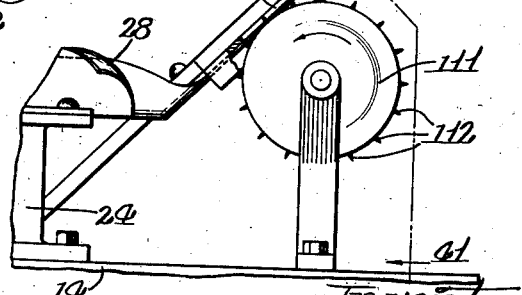
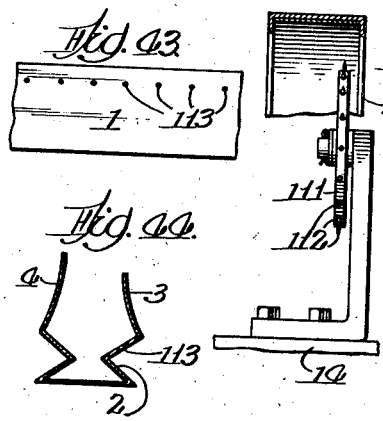

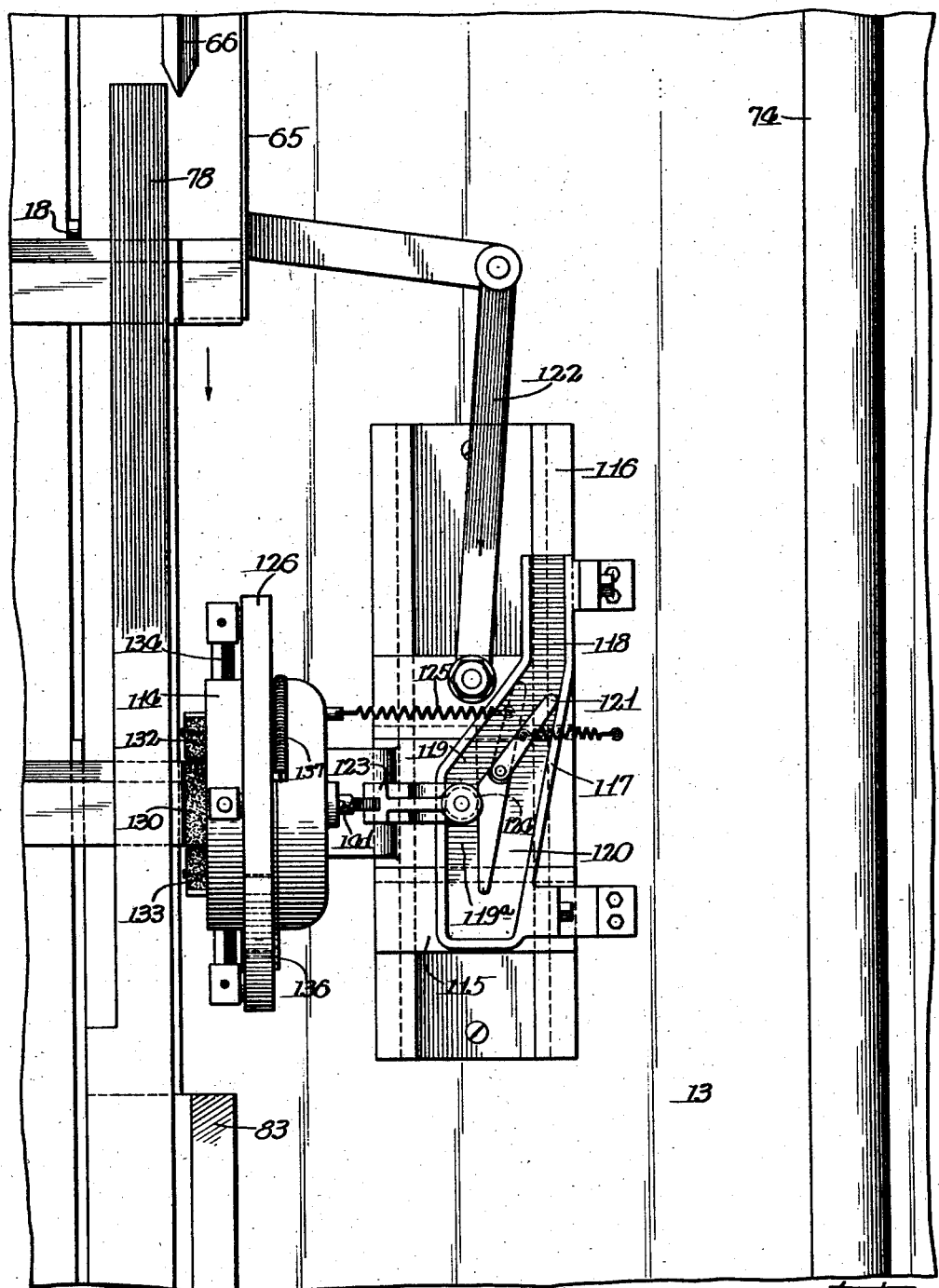

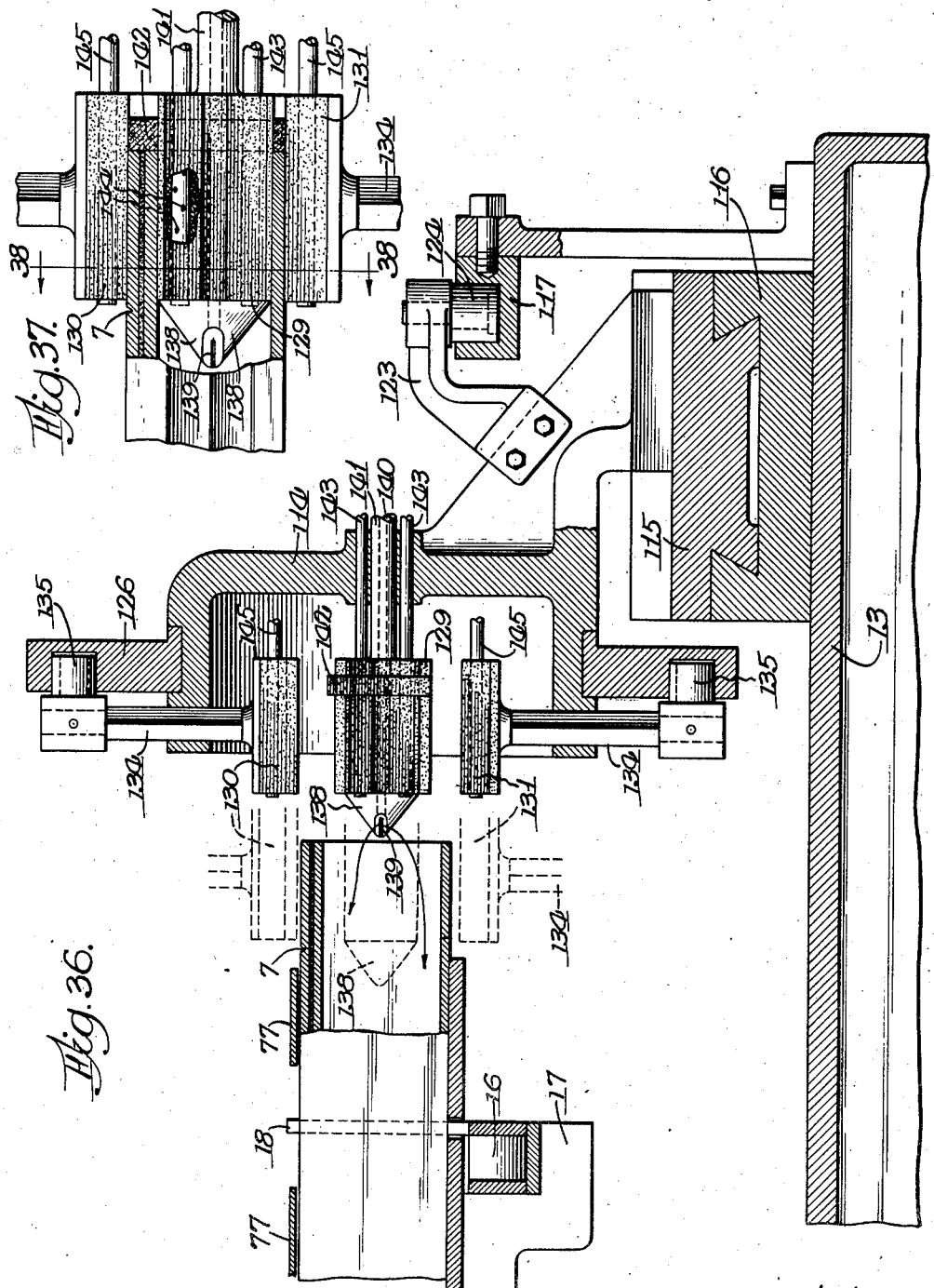

Oct. 30, 1934.  H. J. NEUMILLER  1,978,594
MACHINE FOR MAKING AND SEALING CONTAINERS
FROM TRANSPARENT CELLULOSE MATERIAL
Filed Feb. 8, 1932  12 Sheets-Sheet 12
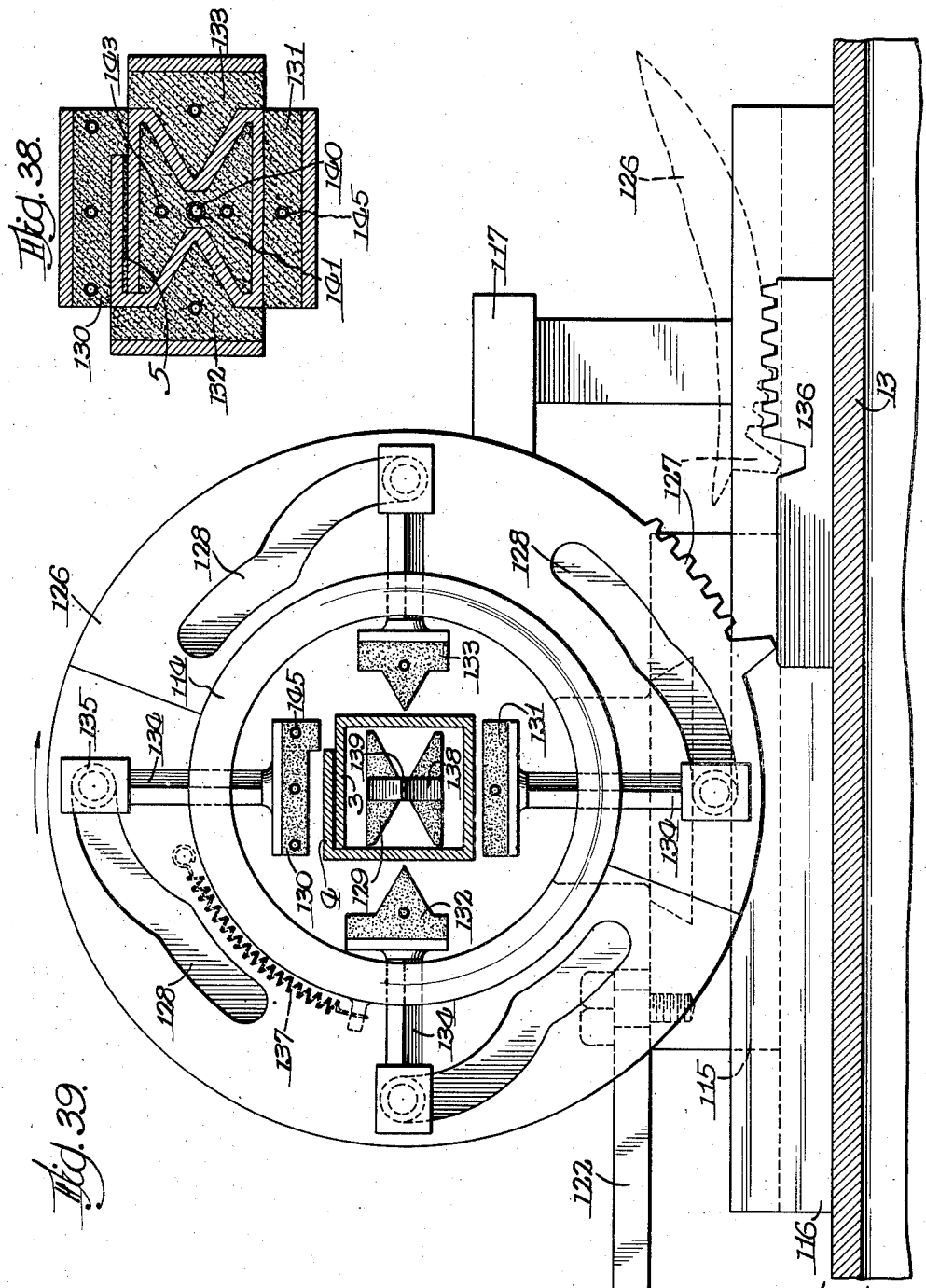
Inventor:
Harry J. Neumiller
By: LaPorte & LaPorte, Attys.

Patented Oct. 30, 1934

1,978,594

UNITED STATES PATENT OFFICE 1,978,594

MACHINE FOR MAKING AND SEALING CONTAINERS FROM TRANSPARENT CELLULOSE MATERIAL

Harry J. Neumiller, Peoria, Ill., assignor to Humitube Mfg. Co., Peoria, Ill., a corporation of Illinois Application February 8, 1932, Serial No. 591,538

33 Claims. (Cl. 93—18)

This invention has reference to a machine or apparatus for forming and completing from a preferably continuous sheet or strip of transparent cellulose material, containers, wrappers or packages, which may be adapted for or useful in merchandising various articles of trade, as for instance, cigars, tobacco, coffee, tea and edibles.

The invention has for its primary object a machine for the manufacture of sealed containers from a continuous sheet or strip of transparent cellulose material, preferably of the moisture proof type, which embodies means for continuously feeding forward the sheet or strip and while so feeding such sheet or strip forming the same into tube-like or package-like form with preferably plicated sides and longitudinal overlapped edge portions; means to apply a sealing medium to said overlapping portion for effectively sealing the same; means to successively sever the formed material into selective length containers; means to receive the severed containers and to convey them, predeterminately spaced, to a remote point from the point of severance; means to successively score the containers transversely adjacent an end; means to apply a sealing medium, such for instance, as acetone, to the entire area of the open end of the containers, adjacent the scored portion; means to guide and gauge the containers during their conveyance whereby to properly position the ends thereof for scoring and application of said sealing medium; means to fold over the scored and treated ends of said containers at the point of scoring by a single fold whereby the scored and treated ends are caused to lie flat against the body of the lengths of the containers; means to apply pressure with or without heat to the folded over ends of the containers for sealing said folded over ends between the surfaces of its plicated sides and between the adjacent surfaces of its folded portions, and preferably during such sealing, undulating the exposed surfaces of said folded over ends whereby to strengthen and reinforce the folded and sealed ends, and means for branding each container with the name of a manufacturer or distributor, or with a specific trade-name or trade-mark.

The invention has for a further object to provide a crimping and straightening means to insure that the tube-like form will, when the container sections have been severed, lie flat and inert for the folding over and sealing of an end thereof and that packing or boxing of the containers may be easily facilitated.

The invention has for a further object to provide means for applying a sealing medium, such as acetone, to an open end of the containers, either by the application of the sealing medium to the edge of one of the open ends of the container and rely or depend on capillarity to spread the sealing medium over the inner and outer surface portions adjacent thereto for a predetermined or selective length thereof, or by a direct application of the sealing medium to the inner and outer surfaces and edge portions of the containers, it is desired to so treat. In this latter instance, means are provided to quickly open the end of the container, to be folded over and sealed, to facilitate the application of the sealing medium to the inner and outer surfaces of the container.

A further object of the invention is to provide a means for perforating the material forming the containers, whereby in the wall of each container there will be a row of spaced, very small perforations or holes which may serve as ventilators or breathers, if such is desired, when the containers contain certain specified products.

The present machine or apparatus is designed for the effective and expeditious carrying out or putting into effect, by an automatic machine, the method of making containers shown in Letters Patent issued to me, February 10, 1931, No. 1,792,388. In this patent I have pointed out a particular material from which the containers are produced and the characteristics thereof which lend to an effective seal on the application of a solvent, such as acetone. Furthermore, as will be apparent, I employ in this present application figures of drawing similar to those of my Patent No. 1,792,388, as a matter of convenience whereby to facilitate a concise and clear understanding of the operation of the machine and the various and successive steps performed by the different and successive elements on the material as it is moved continuously through the machine.

Throughout the description the expressions "sealing medium"; "medium"; "solvent", and "acetone" are used when referring to the sealing of the overlapping longitudinal edges of the tube-like form and also when referring to the folded over and sealed ends of the containers. The character of the "medium" used is dependent on the specific material used from which the containers are made. When employing a plain transparent cellulose material from which to make the containers requires the use of a "sealing medium" different from that usable when the material is a moisture proof cellulose material; although in the case of the moisture proof material the longitudinal seam of the folded over portions may be sealed with a suitable adhesive or glue, while it is more effective and more desirable to employ a "solvent", as for instance, "acetone", applied to the surfaces of the end to be folded over and sealed and apply pressure with heat to the end so folded. The pressure is desirable since the material is folded on itself by a single fold to provide a sealed end and aids in the setting of the turned over portions against the body of the lengths of the containers, and the heat acts to evaporate excess solvent with the attending result that the seal may be quickly and effectively made.

Other and further objects will more fully appear from the following description.

That the invention may be more fully understood, reference is had to the accompanying drawings illustrating a preferred embodiment of the invention, in which:

Fig. 1 is a plan view showing a strip of the cellulose material and several of the steps which are performed in the shaping of the material and before the severance of the lengths of the container shapes therefrom;

Fig. 2 is a side elevation of Fig. 1;

Figure 34:
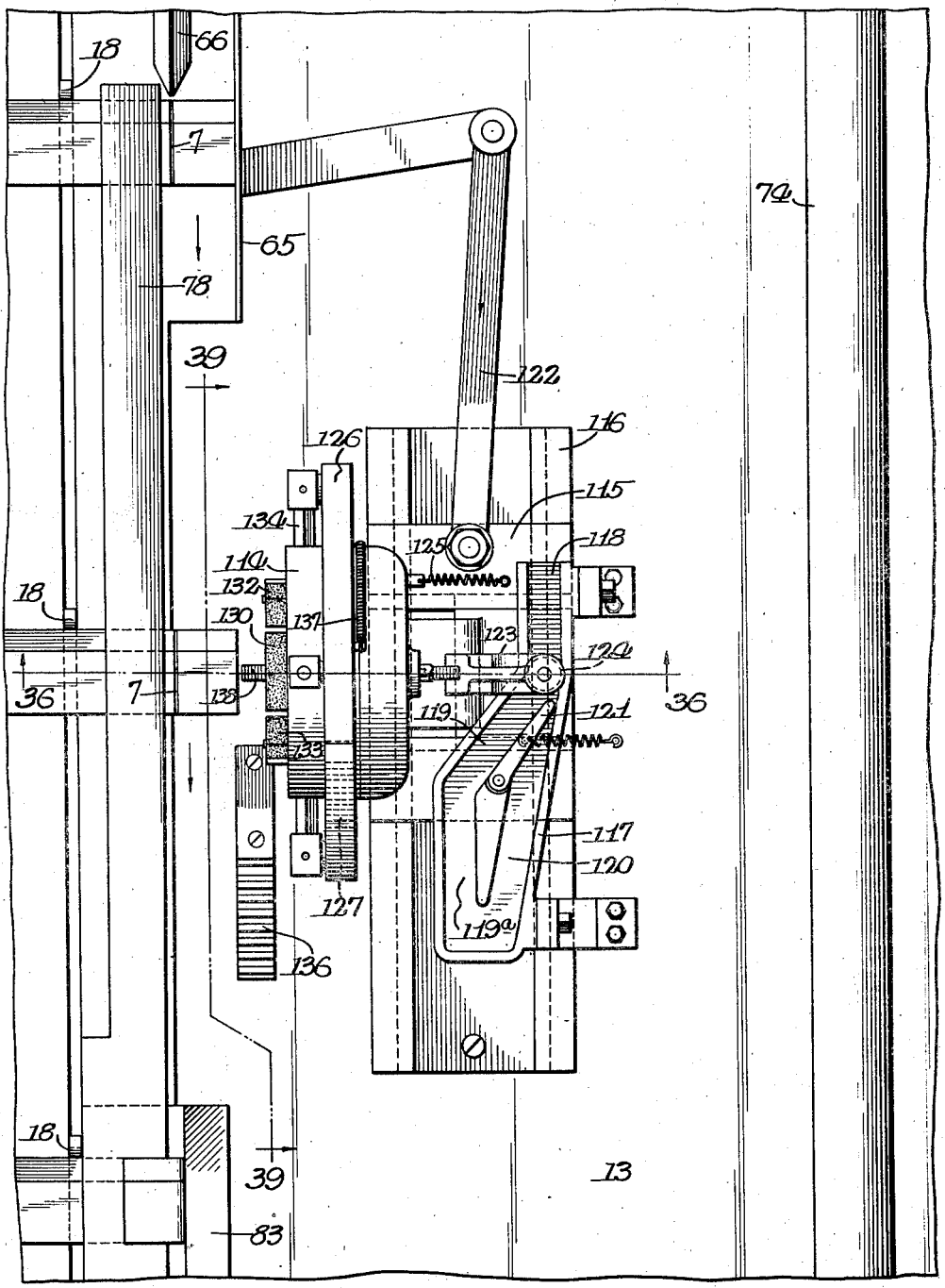

Figs. 1ª and 2ª illustrate extensions of Figs. 1 and 2 to show a portion of the material formed and sealed in container shape and before the selective container lengths have been severed and an end folded and sealed;

Figs. 1ᵇ and 2ᵇ show in plan and elevation severed lengths of containers, partly broken away as these lengths may have any predetermined length and width when severed from the formed material;

Fig. 3 is a transverse sectional view of a selective width of the cellulose material from which one form of container may be made;

Fig. 4 is a cross-section as the same would appear if taken on the line 4—4, Fig. 1, illustrating a first step in the formation of a specific type of container as shown in Fig. 19;

Figs. 5, 6 and 7 are cross-sections as the same would appear if taken on the lines 5—5; 6—6; and 7—7, respectively, of Fig. 1, and illustrate successive steps in the method of forming the material into container shape and particularly one such as shown in Fig. 19;

Fig. 8 is a cross-section as the same would appear if taken on the line 8—8 of Fig. 1 and is representative of that portion of the formed length of material where a sealing medium is applied to one of the overlapping edges of the formed material included in the step of sealing such edges;

Fig. 9 is a cross-section as the same would appear if taken on the line 9—9, Fig. 1, and illustrates the form the material assumes for a specific type of container and the sealing of the overlapping edges;

Figs. 10 and 11 are plan views, respectively, of the formed material in a specific type of container showing scoring in the one instance to determine the length of the folded over end portion which is to be sealed and in the other instance the scoring as well as the initial applying of a sealing medium to the end of the container, which said medium as illustrated in Fig. 12, in this instance, by capillarity covers the scored end of the container;

Fig. 12 is a perspective of the end of a severed container length before the end to be sealed is folded over and showing the sealing medium applied thereto;

Fig. 13 is a view showing the end of the container to be sealed with a sealing medium applied thereto and a step in the method where an additional amount of sealing medium is applied to the surface which is folded over when the end of the container is folded to be sealed;

Fig. 14 is a view of the end of the container to be folded with a sealing medium applied and before the fold is made;

Fig. 15 is an end view of Fig. 14;

Fig. 16 is a view of the treated end of the container when folded over and just prior to or simultaneous with the step of applying pressure with heat, whereby to set the folded end and to seal by the merging of the coatings treated with a sealing medium and when the excess medium is evaporated by the heat to insure quick sealing;

Fig. 17 is a detail of the completed folded and sealed end of a container after having its surfaces undulated whereby to strengthen and reenforce said folded and sealed end;

Fig. 18 is an end view of Fig. 17;

Fig. 19 is a perspective view of a specific type of container especially adapted for receiving a single piece of merchandise, as for example, a cigar, and having a folded and sealed end, overlapping sealed portions and plicated sides;

Fig. 20 is a plan view of a container such as shown in Fig. 19 on which has been applied or imprinted the name of a manufacturer or distributor or specific trade name branding;

Fig. 21 is a fragmentary plan view of a machine embodying the invention herein described;

Fig. 21ª is a fragmentary plan view, partially in section, showing the invention and in association with Fig. 21 shows a part of the material feeding and container forming means:

Fig. 21ᵇ is a side elevation of the complete mechanism shown in Fig. 21ª, but on a somewhat larger scale;

Fig. 22 is a cross-section enlarged, as the same would appear if taken on the line 22—22, Fig. 21ª;

Fig. 23 is a cross-section enlarged, as the same would appear if taken on the line 23—23, Fig. 21ª;

Fig. 24 is a cross-section enlarged, as the same would appear if taken on the line 24—24, Fig. 21;

Fig. 25 is an enlarged sectional detail of parts shown in Fig. 24 and in addition showing the container formed;

Fig. 26 is an enlarged detailed cross-section, as the same would appear if taken on the line 26—26, Fig. 21;

Fig. 27 is an enlarged sectional elevation, as the same would appear if taken on the line 27—27, Fig. 21;

Fig. 28 is an enlarged detail of the scoring means shown in Fig. 27;

Fig. 29 is an enlarged sectional elevation as the same would appear if taken on the line 29—29, Fig. 21;

Fig. 30 is an enlarged sectional elevation as the same would appear if taken on the line 30—30, Fig. 21;

Fig. 31 is a fragmentary plan, partially in section, of the folding or turning over means for the ends of the containers;

Fig. 32 is a detailed sectional view as the same would appear if taken on the line 32—32, Fig. 31;

Fig. 33 is a detailed sectional view as the same would appear if taken on the line 33—33, Fig. 31;

Fig. 34 shows a plan view of a modified mechanism for applying the sealing medium to the ends of the containers to be sealed with the parts in initial starting position;

Fig. 35 is a view similar to Fig. 34 except that the mechanism therein illustrated has been moved to a position preparatory to applying a sealing medium to the end of a container;

Fig. 36 is a detailed sectional elevation as the same would appear if taken on the line 36—36, Fig. 34, with dotted lines showing the position of parts in the position in which they would appear in Fig. 35;

Fig. 37 is an enlarged detail partially in section showing the sealing medium applying means in coaction with the end of a container when applying the sealing medium thereto;

Fig. 38 is a cross-section as the same would appear if taken on the line 38—38, Fig. 37;

Fig. 39 is a side elevation, partly in section, as the same would appear if taken on the line 39—39, Fig. 34;

Fig. 40 is a fragmentary elevation, partly in section, showing a means for perforating the material from which the containers are formed;

Fig. 41 is a transverse detail view taken on the line 41—41, Fig. 40;

Fig. 42 is a plan of parts of the machine showing the arrangement at the point where the container material is perforated;

Fig. 43 is a fragmentary plan of the container material showing the perforations therein, and Fig. 44 shows a cross-section of a partially formed container illustrating the point of perforation in a wall thereof.

Like characters of reference denote corresponding parts throughout the figures.

Before entering into a detailed description of the machine or apparatus which embodies the invention for manufacturing containers such as disclosed in the patent referred to, I consider it advisable to describe in a more or less general way the various steps involved in the handling of the material and in the production of the resultant container, and therefore, Figs 1, 1ᵃ, 2 and 2ᵃ, considered together as diagrammatic plan views and elevations, show the strip or sheet 1 of preferably moisture proof coated cellulose material supplied preferably in continuous length from which the completed container in Fig. 19 is made by a series of successive steps during the movement of the sheet or strip 1 in a forward direction. The formation of the sheet or strip 1 into container shape, as, for example, that shown in Fig. 19, (which is illustrative only and not intended as limiting the shape or design of container to be made) is brought about by the material being formed and the containers completed in a manner and by the mechanisms to be described.

I have elected to show the material during the formation thereof into container shape as being formed with the plicated sides 2. This form is desirable but not necessarily essential since containers may be made without plicated sides, as will be understood.

The several steps in the formation of the material into container shape and from which selective container lengths are severed is best seen in Figs. 1, 2, 4, 5, 6 and 7, which will produce a container shape having the plicated sides 2 and the overlapping portions 3 and 4 to provide the longitudinal seam which is sealed throughout the length of the container, as shown in Fig. 9. The steps described in the formation of the sheet or strip 1 to container shape is successively and progressively carried on during the forward movement of said sheet or strip and following the step of sealing the overlapping portions 3 and 4, containers of selective length are severed from the shaped material. Such lengths are shown, although broken away, in Figs. 1ᵇ, 2ᵇ, 10 and 11 and the point of severance is indicated at 6 between the Figs. 1ᵃ and 1ᵇ and between the Figs. 2ᵃ and 2ᵇ. I prefer after the severance of the container lengths from the formed or shaped material to move the container lengths in a direction transverse to the movement of the sheet or strip during the forming operations thereof. This movement is illustrated by the arrangement shown in Figs. 1ᵃ and 2ᵃ and Figs. 1ᵇ, 2ᵇ, 10 and 11. As the individual container lengths are moved they are preferably scored at 7 at a predetermined distance from one open end of such containers and the said scoring is indicative of the point of folding the end 8 of the container on itself whereby to provide the sealed end. Following the scoring step and while the containers are in movement, a suitable adhesive is applied to the scored ends of the containers for purposes of sealing, however, in the use of a moisture proof material, a solvent 9, such as acetone, is preferably applied to the edge of the open edge portion 8 of the respective containers which by capillarity or similar action spreads or creeps in, along and over the interior and exterior surfaces of the end portion 8 of the container, the solvent 9 wetting the innermost creases and crevices formed by the plies or layers of the container in the collapsing and folding thereof; the solvent application being sufficiently light in quantity to insure the capillary action not carrying the solvent beyond the scoring 7. This solvent is preferably applied just preceding the step of folding over the end 8 on the scoring 7 and is for the purpose of softening or liquefying the moisture proof coating on the plies and surface portions of the portion 8 of the containers so that when the portion 8 is folded over, and it is immediately, and by applying pressure, the contiguous surfaces of the material which are pressed into juxtaposed relation are firmly sealed and held together by the merging of the softened or liquefied coating. I prefer when applying the pressure to apply it with heat which latter, as previously pointed out is desirable and is employed to evaporate excess solvent and thereby bring about a quickening in the step of forming and completing the seal. During the application of pressure with heat, I preferably undulate the exposed surfaced portions of the seal as at 10 which not only creates a better bond, but gives added strength and stiffens the said sealed end.

While, in the preferred application of the solvent, capillarity or a similar action is relied or depended upon for wetting the surfaces and innermost creases and crevices of the moisture proof coated cellulose material, a means is disclosed which makes it possible to apply direct the solvent to the surfaces and edges it is desired to treat, for the purpose of sealing the folded over ends of the containers.

I have previously pointed out that in Fig. 19 there is illustrated a specific form of container. This form will receive articles of merchandise but has been designed preferably for holding a single cigar and when the container is so filled its open and unsealed end may be folded over as is now a common practice. Referring to Figs. 13, 14, 15 and 16, it is to be observed that on one surface of the container there is shown a greater thickness or quantity of the solvent application designated 11. This applied solvent is not dependent upon capillarity in the solvent applied to the end edges of the container but is purposely applied so that immediately when the treated end is folded over and brought into contact with the untreated solvent surface of the body of the container, there will be a sufficient solvent between these contiguous surfaces whereby to soften the coating on both the treated solvent coated surface and unsolvent treated surface to insure a mergence and effective adhesion between the merged moisture proof coatings thereon. Such seal is made the more effective by the application of pressure to the folded ends which acts also to set the folded ends and by applying heat with the pressure the excess solvent will be evaporated and insure a quick seal.

On the completion of the container having the folded and sealed end, as shown in Fig. 19, the containers may be successively passed beneath or over a suitable branding device where the name of the manufacturer or distributor may be applied, as shown in Fig. 20, or a suitable marking, as, for example, a trade name may be imprinted on the surface of the container.

By the application of a solvent, such for instance, as acetone, to the surfaces of a cellulose sheet or strip of the type hereinabove referred to, the solvent acts to soften and dissolve the moisture proofing composition combined with the cellulose material resulting in the composition forming an adhesive which, when the treated surfaces are brought into contiguous relation, the softened and dissolved composition, being the adhesive, merges or interpenetrates and forms a seal, with or without pressure, but when pressure is applied will accentuate the seal which is naturally desirable in a continuous operation as herein pointed out. Heat, when applied with the pressure, as pointed out, acts as an evaporator for the solvent and thereby further hastens or speeds up the sealing operation.

Referring now to the means or mechanism forming the embodiment of the preferred form of the machine for producing successively and in rapid progression the containers of Fig. 19 and the like, a suitable support 12 is shown provided with a table having the main portion 13 and the angular lateral extension 14 at one end. It is over this latter portion of the table that the sheet or strip of material 1 is fed into or onto the machine and as the material traverses the extension 14 of the table, the said sheet or strip is formed into a tube-like or package-like form, with plicated sides 2, if desirable, and the longitudinal folded over portions 3 and 4 sealed. The feeding means for advancing the material 1 and tube-like form, as well as the crimping and straightening means, is preferably located at the intersection of the portions 12 and 13 of the table, see Fig. 21. Beyond or on the far side of the feeding means, is located the severing means for severing from the formed tube-like material the predetermined length of individual containers. The severed containers are dropped on and received by a supplemental table 15, which is disposed alongside of and parallel to the portion 13 of the main table, and associated with said supplemental table 15 is a conveyor comprising endless link-members 16 which travel over or through guides 17 beneath the table, see Figs. 26 and 29, and at predetermined spaced points certain of said links are provided with fingers or pushers 18 which are movable through parallel spaced slots 19 extending throughout the length of said table and during their travel through said slots these fingers or pushers protrude or project above the surface of the table to engage with and move the individual containers along and over the table 15, see Fig. 21. As the containers are moved along the table 15 they are preferably scored transversely near one end, a sealing means applied to the scored end and the end folded over and sealed, to complete the containers, and the folded ends preferably undulated to strengthen the seal and finally, if desired, a name or brand is applied to each container body. Furthermore, there is associated with the table 15 and conveyor, a guide and gauge which functions to properly position the ends to be folded and sealed in respect of the elements operating thereon. With the arrangement of the table with its portions 13 and 14 disposed at right angles, as shown, the path of movement of the severed containers is at right angles to the folding and formation of the tube from the sheet or strip, as will be seen from an examination of Fig. 21.

Reference being had, particularly to Figs. 21, 21ᵃ, 21ᵇ and 26, there is provided a pair of feeding rollers 20 and 21, the former being the driving and the latter the driven roller. These rollers are of a material best adapted to feed a cellulose material therebetween. At the feeding-in side or end of the table portion 14 there is provided or supported a downwardly inclined guide 22 into or through which is fed the sheet or strip 1 of the material from which the containers are produced. The lower end of this guide is formed or provided with the inwardly converging portions 23 so that the inner terminal end of the guide presents a tapered end. On the table portion 14, from a point spaced from the guide 22 is a superimposed rest 24, and said rest terminates short of the feeding rollers. On this rest are located and arranged the elements which cause the sheet or strip 1 to take or assume the successive formations shown in Figs. 1 and 2 and Figs. 5, 6, 7, 8 and 9 which transforms the flat strip 1 into a tube-like form with plicated sides, and seals the longitudinal overlapping edges 3 and 4. Disposed centrally of and extending longitudinally throughout the length of the rest 24 is a shallow and narrow guide strip 25 the forward end of which is connected with the guide 22. This guide strip is supported so that it is immediately above and leaves a narrow space between it and the upper face of the rest 24, sufficient only for the passage of the thickness of the material of the sheet or strip 1, although it is suspended or supported at 26, see Figs. 21ᵇ and 22, so that it may be adjusted in relation to the surface of the rest 24. Secured to the rest and in spaced relation on opposite sides of the guide strip 25 and paralleling the same for a suitable distance from the forward end thereof are angular guide plates 27, see Figs. 21ᵃ and 22. The forward ends of these plates are flared outwardly, as at 28, see Figs. 21ᵃ and 21ᵇ. The sheet or strip 1 fed into the machine is threaded down through the guide 22 and where it enters under the guide strip 25 and between the flared ends of the plates, said sheet or strip assumes successively the cross-sectional forms, best seen in Figs. 4 and 22.

The guide strip 25 beyond the far end of the guide plates 27 is formed or provided on its opposite side faces with corresponding longitudinally arranged grooves 29 of the proper contour or shape as will plicate the opposite walls of the tube-like form, as appears at 2 in the tube-like form and resultant containers, when the walls of the tube are pressed thereinto in the manner shown in Fig. 23. This is accomplished by the arrangement of oppositely located rollers 30 journaled on arms 31 adjustably carried on the rest 24, see Fig. 21ª. These rollers have a peripheral contour preferably complementary to the grooves 29 in the guide strip whereby to plicate the tube-like form in manner shown in various figures of the drawings. To form and fold over the longitudinal edge portions of the sheet or strip 1, which, in the resultant containers become the overlapping edge portions 3 and 4, there are provided, between the rollers 30 and the end of the guide strip 25, next adjacent the feeding rollers, a series of forming and guiding elements 32, 33, 34, 35, 36 and 37, see Figs. 21, 21ª and 21ᵇ. These elements have a progressive arrangement in relation to the guide strip 25 and so disposed on opposite sides of said strip and in their relation to each other as will produce in the sheet or strip 1 the progressive formations shown in Figs. 7, 8 and 9, and progressively fold over the portions 3 and 4, as shown in said figures. During such forming and folding of the portions 3 and 4, a sealing medium 5, see Fig. 8, is applied to the under side of the portion 4 of the sheet or strip or tube-like form, so that at the final step of forcing the portion 4 down onto the portion 3 these overlapping longitudinal edges will become sealed. The specific and detailed form and contour of the elements 32 to 37, both inclusive, are not shown, but it will be understood that their shape and contour is such that they will function collectively to produce the results described.

The element 32 is mounted adjustably in its relation to the guide strip 25 on a plate 38 adjustably secured on the rest 24. The elements 33, 36 and 37 are mounted adjustably in their relation to the guide strip 25 on a bar 39 adjustably secured on the rest 24. Also the elements 34 and 35 are mounted adjustably in their relation to the guide strip 25 on a bar 40 adjustably secured on the rest 24, see Figs. 21 and 21ª. The bars 39 and 40, see Figs. 21, 21ª, 24 and 25, are provided with longitudinal tapered ribs 39ª and 40ª, respectively, which cooperate with the grooves 29 respectively, in the strip 25, as shown in Fig. 25, to retain the plicated sides 2 in the tube-like form as the material traverses the length of said strip.

At a suitable point in the length of the guide strip 25 and preferably at a point between the elements 35 and 37, see Fig. 21, there is located a feeder 41 which has communication with a source of supply of a suitable adhesive or sealing medium, not shown, and its discharge end overlies the guide strip 25 so that as the sheet or strip 1 in its course of travel and formation into a tube-like form will pass the feeder and its portion 4 wipe across the discharge end of said feeder with the result that a sealing medium 5 will be applied thereto.

Between the inner end of the rest 24 and the feeding rollers there is preferably located a crimping and straightening means 42 which, in conjunction with the feeding rollers, will flatten the tube-like form, made possible by the plicated sides 2, and in addition, said crimping and straightening means will apply the necessary pressure to insure an effective sealing of the overlying portions 3 and 4 of the tube, as well as insure that the flattened tube will lie flat and be inert so as to facilitate the subsequent step of folding over and sealing an end of the severed individual containers and facilitate the packing and boxing of the finished containers. This crimping and straightening means 42 is preferably supported from one side of a stand 43 in which are journaled the feeding rollers, see Fig. 26, and which said stand is supported on the table. The crimping and straightening means comprises a base plate 44 rounded off at its front end as at 45 and arranged therein near its rear end and protruding above its surface, is a transversely disposed roller member 46. Overlying this base plate and roller is a rider 47 having transversely disposed depending rounded or ball-like surfaces 48 at its opposite ends, which engage the tube-like form on opposite sides of said roller member 46, so that, as shown in Fig. 26, the material or tube-like form is alternately crimped and as a result, when the tube-like form passes beyond this point and in between the feeding rollers it will lie and remain flattened and compressed until and after all subsequent operations thereon have been completed. The feeding roller 20 is operated by a reduction gearing from a preferably electric motor 49, see Fig. 21. Such gearing comprises the gears 50, 51, 52 and 53, the latter attached to the shaft carrying the roller 20, see Figs. 21 and 26.

On the tube-like form passing on beyond the feeding rollers it passes through or over a guide 54, the rear end of which is provided with a cutting edge 55, see Fig. 26, and cooperating with said cutter is a revoluble cutter or blade 56, see also Fig. 21, the latter carried by a rotatable disk 57 on a shaft 58. This shaft carries preferably a bevel gear 58ª in mesh with a bevel gear 59 on a shaft 60 disposed longitudinally of the table portion 13. The latter shaft receives its power from a train of gearing, including the gears 61 and 62, see Fig. 21, and other gears between the gears 53 and 62, only one of which is shown, being designated 63 and shown in dotted lines in Fig. 26 and connected with the shaft carrying the driven roller 21. The cutting operation of the cutter 56 is predetermined and is so timed that it will coact with the cutter 55 as to successively sever from the continuously formed tube-like form containers of predetermined length, see Fig. 21. Up to and including the severance of the container lengths, the tube-like form is moved longitudinally of the table portion 14 and preferably at right angles to the length of the table portion 13. At this point and after the severance of the container lengths their movements are changed and they are caused to travel or be moved laterally along the length of the supplemental table 15 and paralleling the length of the table portion 13, see Fig. 21.

Disposed longitudinally of the supplemental table 15 and extending for a considerable portion of its length and on opposite sides thereof, are guide and gauge strips 64 and 65, respectively. The former is secured adjustably on the supplemental table 15 whereby it may be fixed in different adjusted positions in relation to the strip 65, depending on the lengths of the severed container sections, and the notching faces or edges of these two strips are so designed that the fingers or pushers 18 of the conveyor, as they engage and move the containers along the table 15, the ends of the containers, next adjacent the strip 65, will be positioned in relation to the subsequent steps of scoring and sealing an end of the containers that the same may be effectively accomplished. The strip 65 is preferably shorter than the strip 64 and is effective in association with the strip 64 only after the severing operation, whereas the strip 64 acts as a stop for the tube-like form on the severance of the container lengths, and the conveyor and its fingers or pushers 18 are so timed that the fingers or pushers will become effective to pick up and push container sections along the table 15 on their severance from the tube-like form, as will no doubt be understood.

At a suitable point in the progress of the container lengths along the supplemental table 15 they are preferably scored to facilitate a folding over of an end for sealing and afterwards such ends folded over and sealed. These operations are best seen in Figs. 21, 27 and 28. The scoring means comprises a pair of preferably coacting disks 66 and 67, the former having a scoring edge 68 and acting with the disk 67 to score the body of the containers as shown at 7 in Figs. 10, 11 and 28. The disk 66 is carried on a shaft 69 and the disk 67 is carried on a preferably pivoted arm 70, the latter held under tension by a spring 71 for yieldingly holding the disk 67 in coacting relation with the material to be scored, as will be obvious. The shaft 69 carries a worm or similar gear 72 in mesh with a similar gear 73 on a shaft 74 and the latter receives its power through a gear 75 carried thereby which meshes with a gear 76 on the previously referred to shaft 60. The shaft 69 is continuously rotated so that the disk 66 is effective at all times and as the container sections are conveyed and brought between and coincident with the disks 66 and 67. At or just before the container lengths are brought into coincidence with the scoring means, the bodies of the containers are caused to pass beneath a guide plate 77 lying immediately above the surface of the table 15, see Figs. 21 and 29, which together function to retain the containers from buckling during the scoring and end sealing operations and yet leaving free movement of the containers along the table. Paralleling the plate 77 for some distance and arranged to overlie the scored ends of the containers is a guide plate 78, see Figs. 21 and 29, and the forward end of said plate is slightly upturned, as at 79, see Fig. 21, to insure the easy entrance and travel of the scored ends of the containers therebeneath. The rear end of the guide and gauge strip 65, previously referred to, preferably stops short of the length of the plate 78, see Fig. 21.

At or near the inner terminal end of the plate 78 is preferably located the means for applying the sealing medium to the entire area of the scored ends of the containers. This means, as shown in Figs. 21 and 29, preferably comprises a receptacle, tank or vat 80 for holding an adhesive or suitable fluid. Rotatable in the adhesive or fluid is an applicator having the form of a disk 81 provided with a tapered peripheral surface 82 so that during the forward movement of the containers their scored ends will wipe across such disk and have applied thereto the adhesive for sealing the ends when they are folded over and pressed down. The movement of the ends of the containers across this disk will have a tendency to turn the treated ends of the containers upwardly and inwardly, somewhat as shown in Fig. 32, and as shown in Fig. 13. The liquid forming the adhesive will by capillarity or similar action creep in, along and over the interior and exterior surfaces of the scored end portion 8 of the containers. Immediately following the application of the adhesive or liquid sealing medium, the treated ends of the containers are caused to pass between a guide plate 83, see Figs. 21 and 31, and the plate 78, between which the upturned ends of the containers protrude and immediately thereafter these upturned ends pass beneath an overlying guide plate 84 further depressing or forcing down these treated ends, somewhat as shown in Fig. 33, preparatory to the action of the coacting pressure rollers 85 and 86, see Figs. 21 and 30, for applying the necessary pressure to press down the turned over ends of the containers and effectively sealing the same.

The applicator 81 is carried on a shaft 87 provided with a preferably friction disk 88 driven by a similar disk 89 on the shaft 74. The pressure roller 85 is carried by a head 90 on a preferably hollow shaft 91, see Fig. 30, and the roller 86 is carried by a pivotally supported arm 92 held under tension by a spring 93 which acts to yieldingly hold the roller 86 in coacting relation with the roller 85 during the operation of these rollers when applying pressure to the treated ends of the containers to be sealed. The shaft 91 carries a worm wheel or the like 94, which meshes with a worm or the like 95 on the shaft 74, see Figs. 21 and 30. I prefer that the roller 85 has a flat milled or undulated surface 96 which acts to undulate the surface of the sealed end of the containers, as at 10, thereby, not only creating a better bond but also giving added strength and stiffening the sealed ends. The adhesive or sealing medium may be supplied to the receptacle 80 through the feeder 97, see Fig. 21, in communication with a suitable source of supply, not shown.

When the material 1 is a moisture proof cellulose material, the receptacle 80 may be supplied with and hold a solvent, such as acetone, and when applied, as herein previously described, to the ends of the containers to be sealed, capillarity or similar action may be relied on for the spreading of the solvent in, along and over the interior and exterior surfaces of the end portions to be sealed, the solvent wetting the innermost creases and crevices formed by the plies or layers of the containers in the collapsing and folding thereof. I prefer, in this instance, when the rollers 85 and 86 are applied, to apply such pressure with heat, as the latter, when employed, will act to evaporate excess solvent and thereby bring about a quickening in the step of forming and completing the seal. To accomplish this, a heating element 98 of suitable design and construction is applied within the roller 85 for heating the same, see Fig. 30, and such heating element may be heated in any approved manner, although I have shown it wired to a contact member 99 which may be supplied with the necessary electrical energy through the medium of a means shown at 100 for connection with a source of supply.

On the completion of the containers, each with an end effectively sealed, they may be suitably branded with the name of the manufacturer, or by branding the same with an appropriate trademark or trade-name. This may be accomplished by printing or by other suitable impressionable means. In Fig. 21, I show a roller 101 which may or may not be an inking roller and having thereon the brand to be employed. This roller is on a shaft 102 which is connected with a suitable source of power through a chain or belt drive 103, see Fig. 21. A guiding and spacing means for properly positioning the containers underneath the roller 101 comprise the spaced longitudinal guide plates 104.

The conveyor associated with the table 15 and provided with the fingers or pushers 18 may be operated in any suitable manner and from an advantageous point, so long as the operating means operates in timed relation with other and associated elements in the machine. A form of operating means, such as I disclose, may receive its power from the shaft 74 through a gear 105 on said shaft, in mesh with a gear 106 on a shaft 107, the latter geared through suitable gearing 108 to a cross-shaft 109 forming one of the elements of the conveyor structure, see Fig. 21, other elements being shown in Figs. 26 and 29.

When using the containers for holding cigars it may be considered desirable to perforate the sheet or strip material 1 so as to provide ventilators or breathers, and this may be accomplished by the means and in the manner shown in Figs. 40 to 49, both inclusive. In this instance the guide 22 would be provided with an opening or slot 110 therein and rotatable therebeneath would be a roller 111 having projecting prongs 112 spaced around its periphery and adapted to enter the opening or slot 110 within the path of said prongs 112. As the material 1 is fed forward through the guide 22, the prongs 112 will puncture the same at spaced intervals, as at 113, see Fig. 43, and by so doing cause the roller 111 to rotate whereby to cause the prongs to successively and continuously perforate the said sheet or strip 1 in the manner shown. In Fig. 44 the perforated material is partially formed showing the perforations in one of the plicated sides 2.

I have shown and described in the preceding figures of the drawings, an applicator 81 for applying a suitable adhesive and in one form a solvent, such as acetone, if and when the material to be sealed is a moisture proof cellulose material. In this form the ends of the containers wipe across the applicator and take off the sealing medium and by capillarity or similar action the medium creeps or spreads in, along and over the interior and exterior surfaces of the end portions of the container whereby to seal such ends. In Figs. 34 to 39, both inclusive, I disclose how the sealing medium, as for instance a solvent, such as acetone, may be directly applied to the edge of the open end of the containers and likewise directly applied in, along and over the interior and exterior surfaces of the end portions of such containers, and simultaneously apply a blast of air or gaseous medium to the ends of the containers to open the same to facilitate the introduction of the sealing medium applying means into the ends of such containers. In place of the applicator 81 and its associated receptacle 80, I employ a head 114 supported on a frame for both longitudinal and lateral movement, the head having slidable movement in and crosswise of a frame 115 and the latter having slidable movement in and on a bed-plate 116 disposed longitudinally of the table portion 13. Suitably spaced above and in relation to this frame and bed-plate is an overlying longitudinally disposed guide plate 117 which is formed or provided with the communicating passageways 118, 119 and 120, the passageway 118 being disposed preferably longitudinally of the frame and the latter two arranged at diverging angles therefrom but in communication at their outer ends so as to provide a continuous passageway. At the juncture of the passageway 118 with 119 and 120, a spring controlled switch 121 is located and its normal or open position is that in which it is shown in Figs. 34 and 35, leaving open communication between 118 and 119 and closing communication between 118 and 120, as shown. The frame 115 is reciprocated back and forth by means of a lever or similar construction 122 which has a pivotal connection with the forward end of the frame 115 and with a suitable operating means, not shown, adapted to move the frame in timed relation to the placement of the containers for the application of the sealing medium. To the head 114 is connected a bracket-arm 123 carrying a roller 124 arranged for movement in the passageways 118, 119 and 120.

In Fig. 34 the head 114 is in a retracted or withdrawn position with the roller 124 in the passageway 118. As the frame 115 is moved forward the roller will traverse the passageway 119 while at the same time causing the head 114 to be moved outwardly and laterally from the frame 115 until it reaches its outermost position in Fig. 35 and the dotted line position in Fig. 36. At this moment, due to the fact that the passageway 119 has a portion 119$^a$ extending longitudinally of the frame 115, the head will remain fixed in its outermost position and until the roller 124 reaches the end of the passageway 119$^a$, when a spring 125 which has one end connected to the head 114 and which has become extended, will immediately contract, withdrawing the head and causing the roller 124 to enter the passageway 120 and then due to a reverse movement being imparted to the frame 115, through a reverse operation of the lever means 122, the head will be returned to its retracted position and the roller 124 pass by the switch 121 ready for a further operation, in the manner described.

On the head 114 is arranged a rotatable plate 126 which is provided at one point and for a short distance on its periphery with a suitable segment of a gear 127 and in the body of said plate there are provided a series of cam-like slots 128, preferably four, which are spaced equidistantly around said plate. Located within said head is an axially disposed applicator 129 and supported within the head, equidistantly thereabout and at preferably diametrically disposed positions, are other applicators, 130, 131, 132 and 133, see Figs. 36, 38 and 39. Each of these applicators has a support 134 projecting outwardly through the head 114 and each carrying a roller 135 disposed within and adapted to move in the slots 128 in the plate 126.

When the head 114 has been moved to its outer and operating position, the roller 124 assumes the position shown in Fig. 35. During the further forward movement of the frame 115 and while the roller 124 is traversing the portion 119$^a$ of the passageway 119, the segment rack 127 on the plate 126 will enter a stationary rack-segment 136, see the dotted line position in Fig. 39, and moving over said rack-segment, the plate 126 will have imparted to it a partial rotation. Such rotation will have the effect of moving the supports 134 radially from an outward inoperative position shown in Figs. 36 and 39 to an inward operative position shown in dotted lines in Fig. 36 and full lines in Fig. 38. This is brought about by the contour of the slots 128, as will be obvious. During the rotative moment of the plate 126 resulting from the engagement of the segment 127 with the rack 136, a spring 137, connected at one end to the plate 126 and its other end connected to the head 114, will be expanded, but immediately on the segment leaving the rack, said spring will contract, returning the plate 126 to its inoperative position and at the same time withdraw and retract the applicators 130 to 133 radially to their inoperative positions.

The applicator 129 has a contour which will permit it to enter an open ended container and it has a nose or tapered end or nozzle 138 provided with a jet or opening 139 in communication with a duct 140 arranged axially in a stem 141 which is in communication with a suitably controlled air supply or gaseous medium, not shown. As the applicator 138 approaches an end of a container, air or other gaseous medium will be discharged through the nozzle into the container and expand it to permit the entrance of the applicator into the container. This applicator is also provided with a shoulder or flange 142 arranged for abutting relation with the edge of the open end of the containers, as shown in Fig. 37. Within this applicator are also disposed feeders 143 which are perforated, as at 144, see Fig. 37, and said feeders have communication with a suitable source of sealing medium or a solvent, such as acetone, which at proper intervals is fed into and through said feeders. The applicator 129 being of a suitable substance for absorbing and spreading the sealing medium received, through the feeders the medium will be taken up by the contacting surfaces of the container so that when the end of the container is folded over it will effectively seal adjacent or contiguous surfaces thereof.

The cross-sectional shape or design of each of the applicators 129 to 133, inclusive, is best seen in Figs. 38 and 39, and in the former figure in coacting and operative relation applying the sealing medium in, along and over the interior and exterior surfaces of the end portion of the container. The applicator 129 is shaped, as shown in this instance, to adapt it to insertion within a container having plicated sides. The applicator 130 has a cross-sectional contour and designed to contact with the surface of the container embodying the folded over and sealed portions 3 and 4, see Figs. 38 and 39; the applicator 131 has a cross-sectional contour or design as will adapt it for contact with a flat surface of the container, as shown, and the applicators 132 and 133 have a cross-sectional contour or design as will adapt them to the opposite plicated sides 2 of the container, as shown. Each of the applicators 130 to 133, inclusive, would preferably, of course, be of the same material as the applicator 129 and they are each provided with feeders 145, similar in every respect to the feeders 143 and said feeders have communication with the same source of sealing medium as do the feeders 143 and they function alike, as well. The only difference, if any, is that the applicator 130 is provided with a series of feeders 145, whereas the applicators 131, 132 and 133 are only provided with one feeder. It is understood, however, that the design of the applicators will be to fit them to the particular design of container to be sealed and they may be provided with the necessary number of feeders required for effective sealing. The stem 141 and the respective feeders 143 and 145, as of course will be understood, are so arranged, although not shown, as to accommodate the forward and return movement of the head 114 and its associated parts.

In connection with the feeding of the container form and the severance thereof into container lengths, I have pointed out that they are severed into predetermined lengths. It is of course realized that these lengths may vary dependent upon the character of the articles to be placed therein. If the articles are cigars, of course it is understood that there are a great variety of lengths of cigars, and to meet this situation I provide for a change in the ratio of the gearing at 61 and 62 and also at 58ᵃ and 59. In the former instance, I slow up or speed up the feeding rollers and also increase or decrease the speed of the cutter. This is an obvious mechanical expedient; that is, in the change of the size of the gears, and so far as I know, it is new in this particular combination. Because of the obviousness of these changes in gearing it has not been thought necessary to illustrate the same.

It is further obvious that any change in the speed of feeding of the container form and the severance of container lengths therefrom, that there should be other changes in the gearing at other points in the mechanism and in the instance of the applicator 81 which is frictionally driven, I provide that the element 89 is slidable on the shaft 74 and in this manner change the speed of rotation of the applicator 81 through the element 88.

What I claim is:

1. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively score each length transversely near one end; means to successively apply a sealing medium to the entire area of the scored ends of said lengths; means to fold over the ends of the lengths so treated, by a single fold, and at the point of scoring, whereby the scored and treated ends are caused to lie flat against the body of the lengths of the containers and means to apply pressure on said folded over ends to effectively seal the same against the body of the lengths of the containers.

2. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively score each length transversely near one end; means to successively apply a sealing medium to the entire area of the scored ends of said lengths; means to fold over the ends of the lengths so treated, by a single fold, and at the point of scoring, whereby the scored and treated ends are caused to lie flat against the body of the lengths of the containers and means to apply pressure with heat on said folded over ends to effectively seal the same against the body of the lengths of the containers.

3. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively score each length transversely near one end; means to successively apply a sealing medium to the entire area of the scored ends of said lengths, means to initially turn said scored ends; means to completely fold over the ends of the lengths so treated, by a single fold, and at the point of scoring, whereby the scored and treated ends are caused to lie flat against the body of the lengths of the containers and means to apply pressure on said folded over ends to effectively seal the same against the body of the lengths of the containers.

4. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively score each length transversely near one end; means to successively apply a sealing medium to the entire area of the scored ends of said lengths, means to initially turn said scored ends; means to completely fold over the ends of the lengths so treated, by a single fold, and at the point of scoring, whereby the scored and treated ends are caused to lie flat against the body of the lengths of the containers and means to apply pressure with heat on said folded over ends to effectively seal the same against the body of the lengths of the containers.

5. In a machine for continuously and progressively making individual containers from a sheet or strip of transparent cellulose material, having in combination, mechanism for continuously feeding said sheet or strip and successivly shaping the same into tube or package like form, sealing its overlying longitudinal edge portions and flattening said tube or package-like form; means for successively severing from said formed and flattened material predetermined container lengths; a conveying means for moving said lengths in predetermined spaced relation from the point of severance; a guiding means and gauge in association with said conveying means for aligning said lengths for subsequent folding and sealing operations of one end thereof; means to successively score each length transversely near one end; means to successively apply a sealing medium to the entire area of the scored ends of said lengths; means to fold over the ends of the lengths so treated, by a single fold, and at the point of scoring, whereby the scored and treated ends are caused to lie flat against the body of the lengths of the containers and means to apply pressure on said folded over ends to effectively seal the same against the body of the lengths of the containers.

6. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; a guiding means and gauge in association with said conveying means for aligning said lengths for subsequent folding and sealing operations of one end thereof; means to successively score each length transversely near one end; means to successively apply a sealing medium to the entire area of the scored ends of said lengths, means to initially turn said scored ends; means to completely fold over the ends of the lengths so treated, by a single fold, and at the point of scoring, whereby the scored and treated ends are caused to lie flat against the body of the lengths of the containers and means to apply pressure with heat on said folded over ends to effectively seal the same against the body of the lengths of the containers.

7. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length transversely near one end; means to successively apply a sealing medium to the entire area of the scored ends of said lengths; means to fold over the ends of the lengths so treated, by a single fold, and at the point of scoring, whereby the scored and treated ends are caused to lie flat against the body of the lengths of the containers and means to apply pressure on said folded over ends to effectively seal the same, and simultaneously undulate the treated area of the folded and sealed ends to strengthen such seal.

8. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to succesively score each length transversely near one end; means to successively apply a sealing medium to the entire area of the scored ends of said lengths; means to fold over the ends of the lengths so treated, by a single fold, and at the point of scoring, whereby the scored and treated ends are caused to lie flat against the body of the lengths of the containers and means to apply pressure with heat on said folded over ends to effectively seal the same, and simultaneously undulate the treated area of the folded and sealed ends to strengthen such seal.

9. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; a guiding means and gauge in association with said conveying means for aligning said lengths for subsequent folding and sealing operations of one end thereof; means to successively score each length transversely near one end; means to successively apply a sealing medium to the entire area of the scored ends of said lengths, means to initially turn said scored ends; means to completely fold over the ends of the lengths so treated by a single fold, and at the point of scoring, whereby the scored and treated ends are caused to lie flat against the body of the lengths of the containers and means to apply pressure with heat on said folded over ends to effectively seal the same, and simultaneously undulate the treated area of the folded and sealed ends to strengthen such seal.

10. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length near one end; means to successively apply a sealing medium to the scored ends of said lengths; means to fold over the ends of the lengths so treated and at the point of scoring; means to apply pressure on said folded over ends to effectively seal the same, and means for applying a designating mark to the bodies of said containers.

11. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length near one end; means to successively apply a sealing medium to the scored ends of said lengths and simultaneously initially turn said scored ends; means to completely fold over the ends of the lengths so treated and at the point of scoring; means to apply pressure with heat on said folded over ends to effectively seal the same and simultaneously undulate the folded and sealed ends to strengthen such seal, and means for applying a designating mark to the bodies of said containers.

12. In a machine for continuously and progressively making individual containers from a sheet or strip of transparent cellulose material, having in combination, mechanism for continuously feeding said sheet or strip and during its movement perforate the same to provide ventilators or breathers and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length near one end; means to successively apply a sealing medium to the scored ends of said lengths; means to fold over the ends of the lengths so treated and at the point of scoring and means to apply pressure on said folded over ends to effectively seal the same.

13. In a machine for continuously and progressively making individual containers from a sheet or strip of transparent cellulose material, having in combination, mechanism for continuously feeding said sheet or strip and during its movement perforate the same to provide ventilators or breathers and successively shaping the same into tube of package-like form, sealing its overlying longitudinal edge portions and flattening said tube or package-like form; means for successively severing from said formed and flattened material predetermined container lengths; a conveying means for moving said lengths in predetermined spaced relation from the point of severance; a guiding means and gauge in association with said conveying means for positioning said lengths for subsequent folding and sealing operations of one end thereof; means to successively score each length near one end; means to successively apply a sealing medium to the scored ends of said lengths and simultaneously initially turn said scored ends; means to completely fold over the ends of the lengths so treated and at the point of scoring; and means to apply pressure on said folded over ends to effectively seal the same and simultaneously undulate the folded and sealed ends to strengthen such seal.

14. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length transversely near one end; means to successively apply a solvent to the entire area of the scored ends of said lengths; means to fold over the lengths so treated, by a single fold, and at the point of scoring, whereby the scored and treated ends are caused to lie flat against the body of the lengths of the containers and means to apply pressure with heat on said folded over ends whereby to quickly evaporate excess solvent and to effectively seal the same against the body of the lengths of the containers.

15. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length transversely near one end; means to successively apply a solvent to the entire area of the scored ends of said lengths; means to fold over the lengths so treated, by a single fold, and at the point of scoring, whereby the scored and treated ends are caused to lie flat against the body of the lengths of the containers and means to apply pressure with heat on said folded over ends whereby to quickly evaporate excess solvent and to effectively seal the same against the body of the lengths of the containers and simultaneously undulate the treated area of the folded and sealed ends to strengthen such seal.

16. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length transversely near one end; means to successively apply a solvent to the entire area of the scored ends of said lengths, means to initially turn said scored ends; means to completely fold over the lengths so treated, by a single fold, and at the point of scoring, whereby the scored and treated ends are caused to lie flat against the body of the lengths of the containers and means to apply pressure with heat on said folded over ends whereby to quickly evaporate excess solvent and to effectively seal the same against the body of the lengths of the containers.

17. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length transversely near one end; means to successively apply a solvent to the entire area of the scored ends of said lengths, means to initially turn said scored ends; means to completely fold over the lengths so treated, by a single fold, and at the point of scoring, whereby the scored and treated ends are caused to lie flat against the body of the lengths of the containers and means to apply pressure with heat on said folded over ends whereby to quickly evaporate excess solvent and to effectively seal the same against the body of the lengths of the containers and simultaneously undulate the treated area of the folded and sealed ends to strengthen such seal.

18. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; a guiding means and gauge in association with said conveying means for aligning said lengths for subsequent folding and sealing operations of one end thereof; means to successively score each length transversely near one end; means to successively apply a solvent to the entire area of the scored ends of said lengths; means to fold over the lengths so treated, by a single fold, and at the point of scoring, whereby the scored and treated ends are caused to lie flat against the body of the lengths of the containers and means to apply pressure with heat on said folded over ends whereby to quickly evaporate excess solvent and to effectively seal the same against the body of the lengths of the containers.

19. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; a guiding means and gauge in association with said conveying means for aligning said lengths for subsequent folding and sealing operations of one end thereof; means to successively score each length transversely near one end; means to successively apply a solvent to the entire area of the scored ends of said lengths and, means to initially turn said scored ends; means to completely fold over the lengths so treated, by a single fold, and at the point of scoring, whereby the scored and treated ends are caused to lie flat against the body of the lengths of the containers and means to apply pressure with heat on said folded over ends whereby to quickly evaporate excess solvent and to effectively seal the same against the body of the lengths of the containers and simultaneously undulate the treated area of the folded and sealed ends to strengthen such seal.

20. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length near one end; means to successively apply a solvent to the scored ends of said lengths; means to fold over the lengths so treated and at the point of scoring; means to apply pressure on said folded over ends to effectively seal the same, and means for applying a designating mark to the bodies of said containers.

21. In a machine for making containers of tube or package-like form from a transparent cellulose material, in combination, mechanism for forming the containers; mechanism for moving the formed containers in spaced relation to each other; mechanism for applying a sealing medium to an open end of said containers comprising a series of applicators adapted to be moved toward and from said containers and with the same for a predetermined distance, one of said applicators adapted to apply the sealing medium to the interior surfaces of the containers while the other applicators are adapted to apply the sealing medium to the outer surfaces of the containers; means to fold over the treated ends of the containers, and means to apply pressure to said treated and folded over ends for effectively sealing the same.

22. In a machine for continuously and progressively making individual containers from a sheet or strip of transparent cellulose material, having in combination, mechanism for continuously feeding said sheet or strip and successively shaping the same into tube or package-like form having plicated sides, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively score each length transversely near one end; means to successively apply a sealing medium to the entire area of the scored ends of said lengths; means to fold over the ends of the lengths so treated, by a single fold, and at the point of scoring, whereby the scored and treated ends are caused to lie flat against the body of the lengths of the containers and means to apply pressure on said folded over ends to effectively seal the same against the body of the lengths of the containers.

23. In a machine for continuously and progressively making individual containers from a sheet or strip of transparent moisture proof cellulose material, having in combination, mechanism for continuously feeding said sheet or strip and successively shaping the same into tube or package-like form having plicated sides, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively score each length transversely near one end; means to successively apply a solvent to the entire area of the scored ends of said lengths; means to fold over the lengths so treated, by a single fold, and at the point of scoring, whereby the scored and treated ends are caused to lie flat against the body of the lengths of the containers and means to apply pressure with heat on said folded over ends whereby to quickly evaporate excess solvent and to effectively seal the same against the body of the lengths of the containers.

24. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; means for selectively varying the lengths of the containers; a conveying means for moving said lengths in predetermined spaced relation from the point of severance; means to successively score each length near one end; rotative means to successively apply a sealing medium to the scored ends of said lengths; means to regulate the speed of rotation of said rotative applicator; means to fold over the ends of the lengths so treated and at the point of scoring, and means to apply pressure on said folded over ends to effectively seal the same.

25. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively apply a sealing medium to the entire area of a predetermined portion of one end of said lengths; means to fold over the ends of the lengths so treated, by a single fold, whereby the treated ends are caused to lie flat against the untreated body of the lengths of the containers, and means to apply pressure on said folded over ends to effectively seal the same against the body of the lengths of the containers.

26. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively apply a solvent to the entire area of a predetermined portion of one end of said lengths; means to fold over the lengths so treated, by a single fold, whereby the treated ends are caused to lie flat against the untreated body of the lengths of the containers, and means to apply pressure with heat on said folded over ends whereby to quickly evaporate excess solvent and effectively seal the same against the body of the lengths of the containers.

27. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; a guiding means and gauge in association with said conveying means arranged on opposite sides thereof and extending a substantial distance of the length thereof, one of said guiding and gauging means being adjustable, for aligning said lengths for subsequent folding and sealing operations of one end thereof; means to successively score each length transversely near one end; means to successively apply a sealing medium to the entire area of the scored ends of said length; means to fold over the ends of the lengths so treated, by a single fold, and at the point of scoring, whereby the scored and treated ends are caused to lie flat against the body of the lengths of the containers and means to apply pressure on said folded over ends to effectively seal the same against the body of the lengths of the containers.

28. In a machine for continuously and progressively making individual containers from a sheet or strip of transparent cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; a guiding means and gauge in association with said conveying means arranged on opposite sides thereof and extending a substantial distance of the length thereof, one of said guiding and gauging means being adjustable, for aligning said lengths for subsequent folding and sealing operations of one end thereof; means to successively score each length transversely near one end; means to successively apply a sealing medium to the entire area of the scored ends of said lengths; means to fold over the ends of the lengths so treated, by a single fold, and at the point of scoring, whereby the scored and treated ends are caused to lie flat against the body of the lengths of the containers and means to apply pressure with heat on said folded over ends to effectively seal the same, and simultaneously undulate the treated area of the folded and sealed ends to strengthen such seal.

29. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; means to successively score each length transversely near one end; means to successively apply a solvent to the entire area of the scored ends of said lengths; means to fold over the lengths so treated, by a single fold, and at the point of scoring, whereby the scored and treated ends are caused to lie flat against the body of the lengths of the containers and means to apply pressure on said folded over ends to effectively seal the same against the body of the lengths of the containers.

30. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths, including means for selectively varying the lengths of said containers; a conveying means for moving said lengths in predetermined spaced relation from the point of severance; means to successively score each length transversely near one end; means to successively apply a solvent to the entire area of the scored ends of said lengths; means to fold over the lengths so treated, by a single fold, and at the point of scoring, whereby the scored and treated ends are caused to lie flat against the body of the lengths of the containers and means to apply pressure on said folded over ends to effectively seal the same against the body of the lengths of the containers.

31. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions and flattening said tube or package-like form; means for successively severing from said formed and flattened material predetermined container lengths; a conveying means for moving said lengths in predetermined spaced relation from the point of severance; a guiding means and gauge in association with said conveying means arranged on opposite sides thereof and extending a substantial distance of the length thereof, one of said guiding and gauging means being adjustable, for aligning said lengths for subsequent folding and sealing operations of one end thereof; means to successively score each length transversely near one end; means to successively apply a solvent to the entire area of the scored ends of said lengths; means to fold over the lengths so treated, by a single fold, and at the point of scoring, whereby the scored and treated ends are caused to lie flat against the body of the lengths of the containers and means to apply pressure with heat on said folded over ends whereby to quickly evaporate excess solvent and to effectively seal the same against the body of the lengths of the containers.

32. In a machine for continuously and progressively making individual containers from a sheet or strip of transparent cellulose material, having in combination, mechanism for continuously feeding said sheet or strip and successively shaping same into tube or package-like form, sealing its overlying longitudinal edge portions, means for crimping and straightening said formed material; means for successively severing from said formed material predetermined container lengths; a conveying means for moving said lengths in predetermined spaced relation from the point of severance; means to successively score each length transversely near one end; means to successively apply a sealing medium to the entire area of the scored ends of said lengths; means to fold over the ends of the lengths so treated, by a single fold, and at the point of scoring, whereby the scored and treated ends are caused to lie flat against the body of the lengths of the containers and means to apply pressure on said folded over ends to effectively seal the same against the body of the lengths of the containers.

33. In a machine for continuously and progressively making individual containers from a sheet or strip of transparent moisture proof cellulose material, having in combination, mechanism for continuously feeding said sheet or strip and successively shaping the same into tube or package-like form, sealing its overlying longitudinal edge portions, means for crimping and straightening said formed material; means for successively severing from said formed material predetermined container lengths; a conveying means for moving said lengths in predetermined spaced relation from the point of severance; means to successively score each length transversely near one end; means to successively apply a solvent to the entire area of the scored ends of said lengths; means to fold over the lengths so treated, by a single fold, and at the point of scoring, whereby the scored and treated ends are caused to lie flat against the body of the lengths of the containers, and means to apply pressure on said folded over ends to effectively seal the same against the body of the lengths of the containers.

HARRY J. NEUMILLER.